F. M. FURBER.
AUTOMOBILE LOCK.
APPLICATION FILED NOV. 5, 1920.

1,429,334.

Patented Sept. 19, 1922.
2 SHEETS—SHEET 1.

INVENTOR
Frederick M. Furber,
By his Attorney,
J. H. McCurdy.

F. M. FURBER.
AUTOMOBILE LOCK.
APPLICATION FILED NOV. 5, 1920.

1,429,334.

Patented Sept. 19, 1922.
2 SHEETS—SHEET 2.

INVENTOR
Frederick M. Furber,
By his Attorney,
J.H. McCready.

Patented Sept. 19, 1922.

1,429,334

UNITED STATES PATENT OFFICE.

FREDERICK M. FURBER, OF REVERE, MASSACHUSETTS.

AUTOMOBILE LOCK.

Application filed November 5, 1920. Serial No. 421,949.

*To all whom it may concern:*

Be it known that I, FREDERICK M. FURBER, a citizen of the United States, residing at Revere, in the county of Suffolk and State of Massachusetts, have invented certain Improvements in an Automobile Lock, of which the following description, in connection with the accompanying drawings, is a specification, like reference characters on the drawings indicating like parts in the several figures.

The locking of an automobile against theft presents a very difficult problem in urban districts due to the fact that police regulations usually require that a car shall not be locked in such a manner that it cannot be moved in case of fire or other emergency. In many cities the regulations also require that a car shall be left in such a manner that it can be moved around a corner. It is, therefore, an exceedingly difficult matter to comply with these requirements and still secure a car in such a manner that it cannot be stolen and driven away. To devise a practical solution of this problem constitutes the chief object of the present invention.

It is here proposed to solve this problem by providing a novel form of locking device designed to be secured to the steering wheel of an automobile and of such a construction that it will permit a limited movement of the steering wheel necessary to guide the car around a corner, but will prevent a person from sitting in the driver's seat and driving the car in the usual or normal manner.

The nature of the invention will be readily understood from the following description when read in connection with the accompanying drawings, and the novel features will be particularly pointed out in the appended claims.

Referring now to the drawings.

Figure 5:
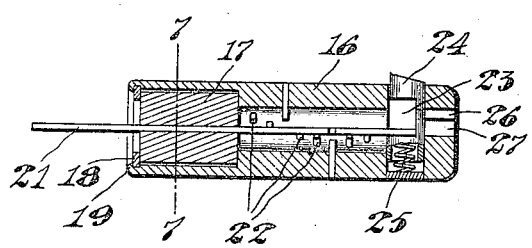
Fig. 5 is a cross sectional view of the locking bolt.
Figure 6:
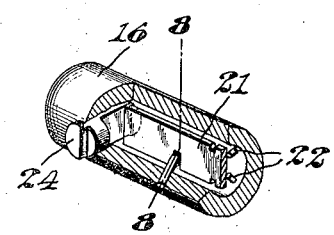
Fig. 6 is an angular view of the locking bolt.
Figure 7:
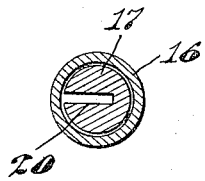
Figure 8:
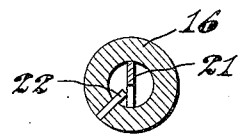

Figs. 7 and 8 are cross sectional views on the lines 7—7 and 8—8 of Figs. 5 and 6, respectively.

The locking device shown in the drawings comprises a body consisting of two parts 2 and 3, respectively, hinged together by a pivot pin 4, and an arm or extension 5 which is slidably mounted in the body. The body parts 2 and 3 are shaped to embrace the rim 6 and one of the spokes 7 of the steering wheel of the automobile, the pivotal mounting of the part 3 on the member 2 enabling this part to swing into the position in which it is shown in dotted lines in Fig. 2 to facilitate the mounting of the device on the steering wheel or its removal therefrom. The body member 3 is provided with two upstanding side pieces which straddle a boss 8 formed on the body part 2, as clearly shown in Figs. 3 and 4, and this boss and side pieces are provided with apertures that register to form a socket to receive a locking bolt, indicated in general at 15, which secures these body members in their closed position. It will be evident that this lock holds these body parts against relative pivotal movement and in order to prevent the side pieces of the member 3 from being spread apart, these pieces are reduced in thickness at their forward edges and sockets or notches 10 are cut in the forward end of the body part 2 to receive these thin portions. In other words, these two parts 3 and 4 have interlocking portions which prevent them from being spread apart in a direction parallel to the axis of the locking bolt.

Figure 1:
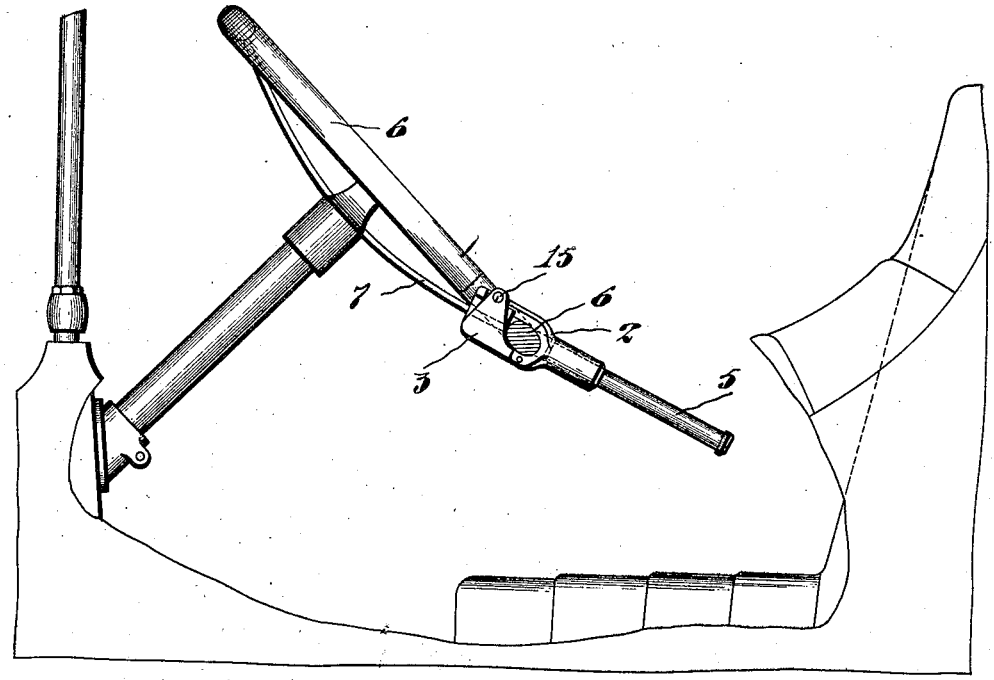
Figure 1 is a side elevation, partly in vertical cross section, showing a locking device mounted on the steering wheel of an automobile.

The arm 5, as clearly shown in the drawings, is mounted to slide in a hollow shank or extension 12 of the body part 2, and it is provided at its opposite ends with heads 13 and 14, respectively, which limit the sliding movement relatively to the body. When the locking device is secured in its operative position on the steering wheel, as shown in Fig. 1, this arm or extension 5 projects into the position normally occupied by the driver. Consequently, it is impossible for a person to sit in the driver's seat and drive the car in a normal manner since the rigid arm 5 would, during the movement of the steering wheel, either engage the person or the driver or relatively stationary and rigid parts of the automobile. In other words, while this locking device will permit the moving of the car as required by the police regulations above mentioned, it effectually prevents the driving of the car in a normal manner, and in fact makes it so awkward and inconvenient to drive the car in any manner, due to the difficulty of shifting gears and turning corners, that an automobile thief would scarcely care to assume the risk involved.

The construction of the locking bolt 15 is clearly illustrated in Figs. 5 to 8 inclusive from which it will be seen that this locking device comprises a hollow cylinder 16 having a cylindrical barrel 17 rotatably mounted in one end thereof, this barrel being held in position by a washer 18, which, in turn, is held in place by the crimped in end 19 of the cylinder. The barrel 17 is slotted, as shown at 20, Fig. 7, to receive a key 21, and a series of pins 22 are fixed in the wall of the cylinder 16 and project into the bore of the cylinder, these pins of course being located differently in different locking devices, and each key being provided with suitable slots to receive the pins of the particular lock for which it is made. The extreme inner end of the key 21 projects into a notch or cut-out portion 23 in a latch 24 which is located in a transverse socket formed in the end portion of the cylinder 16. A spring 25, Fig. 6, tends to hold this latch in its projected position but the key 21, when turned with the barrel 17, exerts a cam action on the lower wall of the notch 23 and retracts the latch against the action of the spring 25. A pin 26 projects from the latch 24 into a slot 27 formed in the end of the cylinder and limits the range of movement of the latch.

Figures 2, 4:
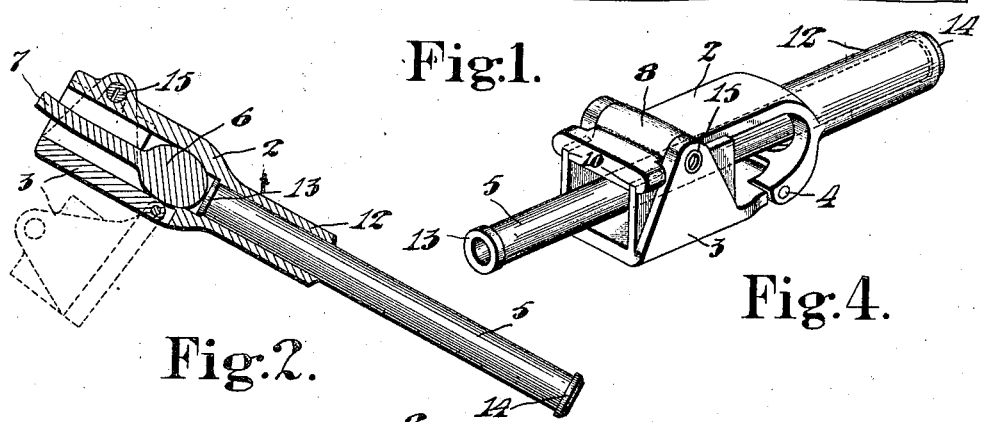
Fig. 2 is a vertical cross sectional view of the locking device shown in Fig. 1.
Fig. 4 is an angular view of said locking device showing it in a different position.
Figure 3:
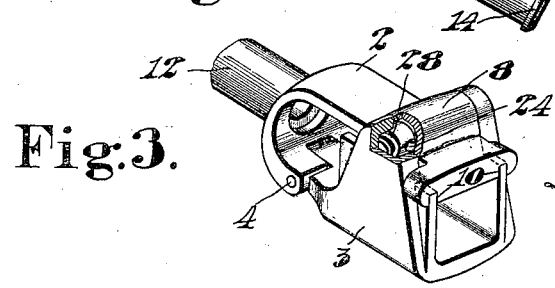
Fig. 3 is a perspective view of a portion of the locking device shown in Fig. 1.

When the body parts 2 and 3 are in their operative positions on the steering wheel, as shown in Fig. 1, the locking bolt 15 may be slipped into the socket, the latch 24 snapping into a notch formed in one of the body parts and securely holding these two parts together. When it is desired to remove the locking device the driver inserts the proper key 21 in the slot 20 and retracts the latch 24, whereupon a spring 28, Fig. 3, which is seated in the end of the socket and bears against the inner end of the locking bolt forces this bolt outwardly. The bolt then is completely withdrawn, the part 3 is dropped into the dotted line position shown in Fig. 2, and the entire device may then be removed from the wheel. The parts 2 and 3 may then be closed, as shown in Fig. 4, and the locking bolt returned to its original position holding these parts together.

It will be observed that while the locking device is on the steering wheel the arm 5 is held in its operative or projected position by virtue of the fact that the rim 6 of the steering wheel prevents this arm from being moved out of said position. After the device has been removed from the steering wheel, however, the arm 5 can then be moved into a retracted or collapsed position with reference to the body part. This fact is of substantial advantage in reducing the dimensions of the locking device when it is not being used and facilitates the storing of it in the pockets or other receptacles provided in an automobile.

Both the body and the arm of this locking device preferably are hardened so that they cannot be cut with a hacksaw or file.

While other locking means can be substituted for the locking bolt 15, this bolt is of particular utility in a device of this character since it is exceedingly difficult to pick this lock or to put it out of commission in any manner. It will be observed that the locking bolt is substantially enclosed in the body part when the device is in use, and this fact makes it impossible to drive or pull the locking bolt out or to break it or unlock it by any of the methods or tools ordinarily employed by automobile thieves. The interlocking of the two body members 2 and 3, as above described, also tends to prevent the removal of the locking device from the steering wheel.

While I have herein shown and described an embodiment of the invention now preferred by me, it will readily be understood that this embodiment will be modified in many particulars within the skill of the mechanic or the discretion of the designer without departing from the spirit or scope of this invention.

What is claimed as new is:

1. A locking device for the steering wheel of an automobile comprising, in combination, a body part carrying means whereby it may be removably locked in a relatively fixed position on said wheel, and a rigid arm movable relatively to said body part into either an extended or retracted position for the purpose described.

2. A locking device for the steering wheel of an automobile comprising, in combination, a body part carrying means whereby it may be removably locked in a relatively fixed position on said wheel, and a rigid arm permanently secured to said body part but movable relatively thereto into either an extended or retracted position.

3. A locking device for the steering wheel of an automobile comprising, in combination, a body part constructed to embrace a portion of said wheel, a lock for securing said body part against removal from said wheel, and a rigid arm movably mounted on said body part but held against substantial bodily movement relatively to said body part when said part is locked on said wheel, said arm being of such a length as to extend away from said wheel into a position preventing the normal driving of the automobile.

4. A locking device for the steering wheel of an automobile having a body portion comprising two parts hinged together and cooperating to embrace the rim and spoke of a steering wheel, and a rigid arm slidably mounted in said body part for movement into an extended or retracted relationship to said body part for the purpose described.

5. A locking device for the steering wheel of an automobile having a body portion comprising two parts hinged together and cooperating to embrace the rim and spoke of a steering wheel, said parts having interlocking portions cooperating to prevent them from being spread apart in one direction, a lock for securing said parts against relative movement in another direction, and an arm projecting from said body portion into a position preventing the normal driving of the automobile.

6. A locking device for the steering wheel of an automobile having a body portion comprising two parts hinged together and cooperating to embrace the rim and spoke of a steering wheel, a lock for removably securing said parts together, one of said parts having a hollow shank, and an arm mounted to slide through said shank.

7. A locking device for the steering wheel of an automobile having a body portion comprising two parts hinged together and cooperating to embrace the rim and spoke of a steering wheel, said parts having apertures registering when they are in their cooperative relationship on said wheel, a locking bolt positioned in said apertures and securing said parts together, and an arm mounted on said body part and projecting away from said wheel into a position preventing the normal driving of the automobile.

8. A locking device for the steering wheel of an automobile having a body portion comprising two parts hinged together and cooperating to embrace the rim and spoke of a steering wheel, a lock for removably securing said parts together, and an arm slidably mounted in said body part for retracting movement into the space in said body that is occupied by said rim and spoke when the body is secured to said wheel.

9. A locking device for the steering wheel of an automobile comprising, in combination, a body having relatively movable parts cooperating to embrace a portion of said wheel, a rigid arm carried by said body and extending away from said wheel into a position preventing the normal driving of the automobile, said parts having apertures registering and uniting to form a socket when said parts are in their cooperative relationship, and a locking bolt removably positioned in said socket and operative to secure said body parts in said relationship.

In testimony whereof I have signed my name to this specification.

FREDERICK M. FURBER.